United States Patent [19]

Brennan et al.

[11] Patent Number: 4,465,793

[45] Date of Patent: Aug. 14, 1984

[54] AROMATIC POLYESTER POLYCARBONATE POLYOLS DERIVED FROM POLYETHYLENE TEREPHTHALATE RESIDUES

[75] Inventors: Michael E. Brennan; George P. Speranza, both of Austin, Tex.

[73] Assignee: Texaco Inc., White Plains, N.Y.

[21] Appl. No.: 491,695

[22] Filed: May 5, 1983

[51] Int. Cl.³ .............................................. C08G 18/14
[52] U.S. Cl. .................................... 521/172; 260/463; 528/271; 528/272; 528/361; 528/370; 528/371; 528/405
[58] Field of Search ............... 528/271, 272, 361, 405, 528/370, 371; 260/463; 521/172

[56] References Cited

U.S. PATENT DOCUMENTS 3,248,414 4/1966 Stevens .............................. 528/196
4,267,120 5/1981 Cuscurida et al. ................. 521/174

Primary Examiner—Maurice J. Welsh
Attorney, Agent, or Firm—Jack H. Park; Kenneth R. Priem; David L. Mossman

[57] ABSTRACT

A novel class of aromatic polyester polycarbonate polyols is described. The polycarbonate polyols are made by reacting an alkylene carbonate with a residue from polyethylene terephthalate (PET) manufacture over a polycarbonate formation catalyst such as potassium stannate. Use of a PET waste stream helps keep the cost of the polycarbonate polyols low. These materials can be used to replace the polyol portion in the preparation of polyisocyanurate foams.

11 Claims, No Drawings

AROMATIC POLYESTER POLYCARBONATE POLYOLS DERIVED FROM POLYETHYLENE TEREPHTHALATE RESIDUES

BACKGROUND OF THE INVENTION

1. Field of the Invention

The invention relates to novel aromatic polyester polycarbonate polyols, and more particularly relates to novel aromatic polyester polycarbonates made from alkylene carbonates or alkylene oxides and carbon dioxide reacted with residues from the manufacture of polyethylene terephthalate.

2. Description of Other Relevant Compounds in the Field

Polyurethane polymers and polyisocyanurate polymers such as those in rigid and flexible foams are well known in the art. The latter type of polymers are by utilizing a polyisocyanurate group formation catalyst to promote formation of both isocyanurate linkages and urethane linkages to produce urethane-modified polyisocyanurate polymers.

Both polyesters and polycarbonates have been used in the preparation of polyurethane polymers. Materials of this type are used to prepare both polyurethane and polyisocyanurate flexible and rigid foams as well as semi-flexible and semi-rigid foams. Polycarbonates may be made by reacting a glycol with a carbonate ester in the presence of a zinc borate-alkali earth metal oxide catalyst system as revealed in U.S. Pat. No. 3,133,113. Various techniques for preparing high molecular weight polycarbonates by reacting dihydric initiators with alkylene oxides and carbon dioxide are taught by U.S. Pat. Nos. 3,248,414; 3,248,415 and 3,248,416.

Polycarbonates have also found utility in coating and laminate form. U.S. Pat. No. 3,764,457 teaches laminates for use as automobile windshields comprising a polycarbonate urethane and one or more sheets of glass. The urethane is formed from an aliphatic polycarbonate, a cycloaliphatic diisocyanate and a monomeric aliphatic diol. Similar laminates employing hydroxyl-terminated polycarbonates are described in German Offenlegungschrifft No. 2,258,131 cited in Chemical Abstracts 82:58865v, 1975.

U.S. Pat. No. 3,758,443 describes the preparation of polyurethane elastomers by reacting polyester polyol polycarbonates, having a molecular weight of 800 to 2,500, with diisocyanates and low molecular weight polyhydric compounds having molecular weights lower than 400. Thermoplastic carbonate-modified co-polyesters for the injection molding process were made by the reaction of aromatic dicarboxylic acids or other esters of dihydric alcohols which have carbonic and ester groupings and hydroxyalkyl end groups according to U.S. Pat. No. 4,041,018.

U.S. Pat. No. 4,072,704 reveals that multiblock coupled polyalkylene glycol co-polymer surfactants may be prepared from individual blocks of polymers and co-polymers by the reaction of these with bifunctional compounds to form polycarbonate esters and polyformates. Further, polyester polycarbonates may be prepared by the reaction of cyclic organic anhydrides, alkylene oxides, carbon dioxide and polyhydric compounds as discussed in U.S. Pat. No. 4,267,120. These latter polycarbonates are shown to be useful for the preparation of polyisocyanurate foams.

While many of the polycarbonates described work well, it is always an objective to make these polycarbonates as cheaply as possible.

SUMMARY OF THE INVENTION

The invention involves novel aromatic polyester polycarbonate polyols made by reacting a residue from the manufacture of polyethylene terephthalate with a carbonating agent selected from the group consisting of alkylene carbonates and the combination of alkylene oxides with carbon dioxide. A polycarbonate formation catalyst is also used to produce the novel polycarbonate polyols.

DETAILED DESCRIPTION OF THE PREFERRED EMBODIMENTS

The novel polycarbonate polyols of this invention are generally less expensive than many other polycarbonates because they are made from residues from the manufacture of polyethylene terephthalate (PET), an inexpensive feedstock. Also, these polycarbonate polyols have utility in a greater number of urethane applications than some other polycarbonates. These novel polycarbonate polyols are useful in isocyanurate foams.

The PET waste stream, also called a residue, generally contains polyethylene terephthalate oligomers and may also contain mono- and polyethylene glycols. The PET residue must contain compounds which have the moiety

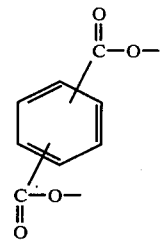

Generally, the polyester PET is formed from ethylene glycol by direct esterification or by catalyzed ester exchange between ethylene glycol, terephthalic acid and dimethyl terephthalate. Besides long chain polymers of PET, there are also formed PET oligomers, diethylene glycol, triethylene glycol and various glycol/terephthalate monomers. Together with monoethylene glycol, and small quantities of other materials such as ash, manganese, water and antimony, these latter compounds make up the residue or liquid waste stream that is separated out from the PET. It is expected that the residues from making other related chemicals, such as polypropylene terephthalate, polybutylene terephthalate and dimethyl terephthalate (DMT) would be effective in making useful polyester polycarbonate polyols.

Preferably, the liquid PET waste stream has a hydroxyl number in the range between 150 and 500, with an especially preferred range between 200 and 400. The hydroxyl number will vary from stream to stream, depending on the glycol content.

To make polycarbonates, it is known to use either alkylene carbonates as the co-reactants or a combination of corresponding alkylene oxides and carbon dioxide. Preferably, the alkylene carbonate is selected from the group consisting of ethylene carbonate, propylene carbonate and butylene carbonate and mixtures thereof.

Thus, the alkylene carbonates and alkylene oxides preferably have from 2 to 4 carbon atoms. These carbonates generate alkylene oxides in situ to react with the PET residue, carbon dioxide being generated as a by-product which is also a co-reactant in the process of making the polycarbonate polyols herein. The mole ratio of alkylene carbonate to the PET residue should be on the order of 10:1 to 2:1, preferably in the range from 8:1 to 4:1.

The process for making polycarbonates somewhat related to the polycarbonate polyols of this invention is known and described in detail in U.S. Pat. No. 4,267,120, incorporated by reference herein. Generally, the alkylene carbonate (or, in the alternative, corresponding alkylene oxides and $CO_2$) is reacted with the PET residue in the presence of a catalyst at an elevated temperature.

Catalysts useful in the practice of this invention include those basic catalysts known to catalyze the production of polycarbonates and include inorganic bases such as alkali carbonates among which are potassium carbonate, sodium carbonate, magnesium carbonate and the like. Alkali hydroxides, such as calcium hydroxide, etc., and alkaline bicarbonates, such as sodium bicarbonate, are also useful. The zinc borate-barium oxide system of U.S. Pat. No. 3,133,113 would also be effective. Preferred catalysts are the alkali stannates such as sodium stannate and potassium stannate, particularly the latter.

The process of this invention is carried out at a temperature of from about 100° to about 200° C. in a liquid phase reaction, preferably at 150° C. A pressure in the range of atmospheric to 150 atmospheres may be used, if desired, preferably between 1 and 75 atm. The reaction may be carried out batchwise or in a continuous manner, as for example, by passing the reactants through a tubular reaction zone under the conditions outlined. The resulting polycarbonate polyols should have a hydroxyl number in the range from about 75 to 300.

The aromatic polyester polycarbonate polyols formed by the process of this invention can be recovered from the reaction mixture by conventional techniques including neutralization of the reaction mixture, recovery of the product by vacuum distillation and filtration of the crude product. The unreacted materials recovered from the reaction mixture may be recycled for reuse according to the process described herein.

The novel polycarbonate polyols prepared according to this invention are light to dark, viscous liquids which are particularly useful in the preparation of polyisocyanurate foams.

The following examples, which are not intended to limit the scope of the invention, will further illustrate it.

EXAMPLES I–III

Preparation of Polyester Polycarbonate Polyols

| Analysis of PET Residue No. 1 | |
|---|---|
| Hydroxyl number | 169 |
| Saponification number | 414 |
| Acid number | 3.4 |
| Ash, % | 0.5 |
| Antimony, % | 0.7 |
| Phosphorus, % | 0.2 |
| Iron, ppm | 230 |
| Calcium, ppm | 18 |

Residue (sludge) was near the consistency of putty or caulk.

A clean and dry, nitrogen purged one-liter stirred stainless steel autoclave was charged with varying amounts of PET residue No. 1, varying amounts of potassium stannate ($K_2SnO_3$) catalyst, 44.0 g (1.0 mole) solid carbon dioxide (dry ice) and 176.0 g (4.0 moles) of ethylene oxide. The whole was then heated to 150° C. and held for six hours. Pressure varied from 890 to 265 psig. The reaction mixture was then cooled to room temperature, vented and the product recovered. Recovery ranged from 91.5 to 87.0%. Products were mobile liquids containing some suspended solids. Solids were removed by filtration through filter aid and the filtrate analyzed. Results follow.

| | Ex. I | Ex. II | Ex. III |
|---|---|---|---|
| Feed | | | |
| PET, g | 88.4 | 265.2 | 303.1 |
| Catalyst, g | 0.7 | 0.9 | 1.0 |
| Product | | | |
| Hydroxyl number | 98.8 | 140 | 151 |
| Acid number | 0.1 | 0.2 | 0.3 |
| Saponification number | 382.3 | 364.4 | 388.2 |
| Water, wt. % | 0.07 | 0.07 | 0.02 |
| Viscosity (25° C.), cs | 8,199 | 19,546 | 16,096 |
| Antimony, ppm | 2,654 | 1,500 | 1,500 |
| Phosphorus, ppm | 255 | 435 | 478 |
| Iron, ppm | 59 | 33 | 4 |
| Calcium, ppm | 14 | 15 | 6 |
| Potassium, ppm | 615 | 585 | 350 |
| Tin, ppm | 267 | 79 | 12 |

EXAMPLES IV–VI

| Analysis of PET Residue No. 2 | |
|---|---|
| Hydroxyl number | 420 |
| Saponification number | 382 |
| Ash, % | 0.9 |
| Antimony, % | 0.21 |
| Iron, ppm | 490 |
| Calcium, ppm | 154 |

Residue was a crude, amorphous solid.

Procedure: Identical to previous procedure with the following exceptions:

Example IV Employed twice as much carbon dioxide and ethylene oxide. Reaction exothermed to 200° C. after 5 hours of reaction. Pressure was 690 to 100 psig. Recovery: 73.8%.

Example V Reaction time decreased to 2.5 hours. Exothermic reaction. Pressure was 590 to 10 psig. Recovery: 87.9%

Example VI Reaction time decreased to 1.5 hours. Reaction exothermed to 187° C. after 45 minutes of reaction. Pressure was 700 to 20 psig. Recovery: 89.2%

Results follows:

| | Ex. IV | Ex. V | Ex. VI |
|---|---|---|---|
| Feed | | | |
| PET, g | 71.1 | 106.7 | 122.0 |
| Catalyst, g | 1.4 | 0.9 | 1.0 |
| Product | | | |
| Hydroxyl number | 128 | 208 | 232 |
| Acid number | 0.3 | 0.3 | 0.7 |
| Saponification number | 161.7 | 299.1 | 248.0 |
| Water, wt. % | 0.12 | 0.06 | 0.50 |

| -continued | | | |
|---|---|---|---|
| | Ex. IV | Ex. V | Ex. VI |
| Viscosity (25° C.), cs | 999 | 1,358 | 1,691 |
| Antimony, ppm | 345 | 1,138 | 1,132 |
| Iron | 16 | 84 | 134 |
| Calcium | 7 | 27 | 62 |
| Potassium | 657 | 475 | 580 |
| Tin | 138 | 550 | 740 |

EXAMPLES VII-X

| Analysis of PET Residue No. 3 | |
|---|---|
| Hydroxyl number | 501 |
| Saponification number | 367.5 |
| Acid number | 14.6 |
| Ash, % | 1.3 |
| Water, wt. % | 0.88 |
| Antimony, % | 0.325 |
| Cobalt, ppm | 701 |
| Iron, ppm | 414 |
| Calcium, ppm | 273 |
| Phosphorus, ppm | 113 |
| Magnesium, ppm | 41 |
| Manganese, ppm | 25 |
| Zinc, ppm | 7 |

Residue ("sludge) was near the consistency of putty or caulk.

Procedure:

A clean and dry, nitrogen purged 1 gallon stirred stainless steel autoclave was charged with varying amounts of PET residue No. 3, varying amounts of potassium stannate ($K_2SnO_3$) catalyst and 704.0 g (8.0 moles) of ethylene carbonate. The reaction mixture was heated to 110°-140° C. before the stirrer was activated and then further heated to 150° C. Ethylene oxide (1056.0 g; 24.0 moles) was pressured into the autoclave over 1-3 hours at 150-±55° C. and 260 psig maximum (exothermed to 174° C. in one case) and then the whole digested for 1-3.5 hours at 150° C. and 30 psig minimum pressure. The product was then recovered as before. Recoveries ranged from 93.5-100.0%. Example X represents a control run made without the presence of catalyst (1 liter autoclave, 1.5 moles of ethylene carbonate, 4.5 moles of ethylene oxide). Results follow for unneutralized and neutralized (N; 1-2% synthetic magnesium silicate, stir 1.0 hour at room temperature and filter) polyols.

| -continued | | | | |
|---|---|---|---|---|
| | VII | VIII | IX | X |
| Feed | | | | |
| PET, g | 238.4 | 715.2 | 818.4 | 153.4 |
| Catalyst, g | 5.6 | 7.2 | 8.0 | None |
| Product | | | | |
| Hydroxyl number | 90.7 | 182 | 218 | 232 |
| Acid number | 0.2 | <0.1 | 0.02 | 0.2 |
| Saponification number | 253.5 | — | 280.1 | 275.1 |
| Water, wt. % | 0.02 | 0.05 | 0.01 | 0.14 |
| Viscosity (25° C.), cs | 7,927 | 3,011 | 2,421 | 477 |
| pH (10:1 MeOH/$H_2O$) | 11.8 | 11.5 | 11.4 | 9.5 |
| Antimony, ppm | 294 | 655 | 759 | 768 |
| Cobalt, ppm | 67 | 203 | 169 | 8 |
| Iron, ppm | 37 | 100 | 71 | 6 |
| Calcium, ppm | 12 | 38 | 40 | 5 |
| Potassium, ppm | 587 | 710 | 659 | — |
| Tin, ppm | 441 | 787 | 857 | — |
| GPC, % EC | 1.7 | 8.0 | 4.2 | 10.4 |
| | Example VIIN | Example VIIIN | Example IXN | Example XN |
| Neutralized Product | | | | |
| Hydroxyl number | 94.6 | 171 | 207 | 224 |
| pH (10:1 MeOH/$H_2O$) | 9.8 | 9.0 | 10.1 | 9.0 |
| Antimony, ppm | 162 | 142 | 429 | 749 |
| Cobalt, ppm | 35 | 4 | 29 | 2 |
| Iron, ppm | 15 | 2 | 15 | 5 |
| Calcium, ppm | 9 | 7 | 31 | 2 |
| Potassium, ppm | 188 | 83 | 180 | — |
| Tin, ppm | 203 | 29 | 202 | — |

Methods of making polyisocyanurate foams are well known in the art. For example, see the disclosures of U.S. Pat. Nos. 4,101,470 and 4,338,408 and others. The following examples are included to show that the polycarbonate polyols of this invention have utility in making polyisocyanurate foams. Generally, the foam is obtained by reacting in the presence of a blowing agent such as trichlorofluoromethane, and a catalyst of polyisocyanurate formation (such as a tertiary amine), an organic polyisocyanate and a polyol, which in this case is replaced by the aromatic polyester polycarbonate polyols of this invention.

EXAMPLE XI

Preparation of Polyisocyanurate Foams

The formulation components were mixed in a metal can at 2,700 rpm and allowed to rise in the can (100 g pour) or poured into a 5"×8"×6" (200 g pour) or 8"×8"×12" (600 g pour) open molds and allowed to rise. The resulting foams were allowed to stand at room temperature for at least three days before testing. Formulations and foam physical properties are listed below.

TABLE I

| Foam | A | B | C | D | E |
|---|---|---|---|---|---|
| Pours | 100 g | 100 g | 200 g | 600 g | 600 g |
| Formulation, pbw | | | | | |
| Polyol, Ex. II (OH = 140) | 32.2 | — | — | — | — |
| Polyol, Ex. III (OH = 151) | — | 30.7 | — | — | — |
| Polyol, Ex. V (OH = 208) | — | — | 24.7 | — | — |
| Polyol, Ex. IV (OH = 128) | — | — | — | 34.0 | — |
| Polyol, Ex. VI (OH = 232) | — | — | — | — | 22.8 |
| Silicone DC-193[1] | 0.5 | 0.5 | 0.5 | 0.5 | 0.5 |
| FREON® R-11b[2] | 12.0 | 12.0 | 12.0 | 12.0 | 12.0 |
| DABCO® TMR-2[3] | 1.5 | 1.5 | 1.5 | 1.5 | 1.5 |
| MONDUR® MR[4] (index = 5.0) | 53.8 | 55.3 | 61.3 | 52.0 | 63.2 |
| Details of Preparation Times, seconds | | | | | |
| Mixing | 3 | 3 | 3 | 3 | 3 |
| Cream | 7 | 6 | 5 | 2+ | 5 |
| Rise | 32 | 26 | 15 | 8 | 15 |

TABLE I-continued

| Foam Pours | A 100 g | B 100 g | C 200 g | D 600 g | E 600 g |
|---|---|---|---|---|---|
| Initial Surface Friability | None | None | Yes | None | Yes |
| Foam Appearance | Good | Good | Fair | Good | Fair |
| Physical Properties | | | | | |
| Density, (lbs/ft$^3$) | 1.95 | 2.29 | 2.21 | 2.51 | 2.00 |
| K-factor | — | — | — | 0.124 | 0.133 |
| Compressive strength, psi | | | | | |
| with rise | — | — | 43.15 | 40.32 | 35.88 |
| against rise | — | — | 14.96 | 20.27 | 20.11 |
| Heat distortion, °C. | — | — | >225 | 183 | 213 |
| Closed cells, % | — | — | 93.43 | 90.76 | 90.49 |
| Friability, wt. % loss, 10 minutes | 4.43 | 5.93 | 7.80 | 13.62 | 34.66 |
| ASTM 1692 Burn, in/min (BHA) | — | — | — | 2.30 | 1.82 |
| Butler Chimney Test | | | | | |
| Flame height, in | — | — | — | 11 | 5.9 |
| Seconds to extinguish | — | — | — | 21 | 11 |
| Wt. % retained | — | — | — | 68.6 | 90.0 |
| Dimensional Stability | | | | | |
| 200° F., Dry, 1 week, ΔV | — | — | — | +7.8 | +5.3 |
| 4 weeks, ΔV | — | — | — | +5.1 | +5.5 |

[1]Silicone surfactant made by Dow-Corning Corp.
[2]Trichlorofluoromethane
[3]Polyisocyanurate catalyst made by Air Products and Chemicals, Inc.
[4]2.7 functionality polymeric isocyanate made by Mobay Chemical Co.

TABLE II

| Foam Pours | F 600 g | G 600 g | H 600 g | I 600 g | J 600 g | K 200 g | L 600 g |
|---|---|---|---|---|---|---|---|
| Formulation, pbw | | | | | | | |
| Polyol, Ex. VIII (OH = 182) | 27.35 | 27.6 | 25.4 | — | — | — | — |
| Polyol, Ex. IX (OH = 218) | — | — | — | 24.3 | 22.3 | — | — |
| Polyol, Ex. X (OH = 232) | — | — | — | — | — | 23.05 | 21.3 |
| Silicone DC-193 | 0.5 | 0.5 | 0.5 | 0.5 | 0.5 | 0.5 | 0.5 |
| FREON ® R-11b | 12.0 | 12.0 | 12.0 | 12.0 | 12.0 | 12.0 | 12.0 |
| DABCO ® TMR-2 | 0.75 | — | 0.75 | — | 0.75 | 0.75 | 0.75 |
| ANTIBLAZE ® 80[1] | — | — | 6.25 | — | 6.25 | — | 6.25 |
| MONDUR ® MR (index = 5.0) | 59.4 | 59.9 | 55.1 | 63.2 | 58.2 | 63.7 | 59.2 |
| Details of Preparation Times, seconds | | | | | | | |
| Mixing | 3 | 3 | 3 | 3 | 3 | 3 | 3 |
| Cream | 6 | 7 | 6 | 6 | 12 | 8 | 9 |
| Gel | 7 | 15 | 8 | 14 | 13 | 15 | 15 |
| Tack free | 11 | 300+ | 9 | 300+ | 15 | 16 | 17 |
| Rise | 12 | 40 | 19 | 25 | 30 | 29 | 34 |
| Initial Surface Friability | Yes | Yes | Yes | Yes | Yes | No | Yes |
| Foam Appearance | Fair | Fair | Fair | Fair | Fair | Good | Fair |
| Physical Properties | | | | | | | |
| Density, (lbs/ft$^3$) | 2.95 | 2.36 | 2.91 | 2.38 | 3.22 | — | 2.58 |
| K-factor | — | 0.120 | 0.114 | 0.115 | — | — | 0.123 |
| Comp. strength, psi | | | | | | | |
| with rise | 57.40 | 50.42 | 50.00 | 39.83 | 50.25 | — | 40.55 |
| against rise | 24.53 | 14.86 | 21.77 | 10.95 | 19.71 | — | 16.67 |
| Heat distortion, °C. | 221 | 204 | 200 | >225 | >225 | — | 224 |
| Closed cells, % | 90.87 | 91.30 | 90.53 | 88.35 | 85.73 | — | 88.44 |
| Friability, wt. % loss, 10 minutes | 22.5 | 17.9 | 34.8 | 23.8 | 50.5 | — | 51.6 |
| ASTM 1692 Burn, in/min (BHA) | 1.07 | 1.40 | 1.18 | 1.46 | 1.21 | — | 1.25 |
| Butler Chimney Test | | | | | | | |
| Flame height, in | 6.4 | 6.7 | 4.7 | 5.8 | 4.8 | — | 4.5 |
| Seconds to extinguish | 10.7 | 10.8 | 10.0 | 13.6 | 10.0 | — | 10.0 |
| Wt. % retained | 93.4 | 92.5 | 94.7 | 93.7 | 95.9 | — | 95.2 |
| Dimensional Stability | | | | | | | |
| 200° F., Dry, 1 week, ΔV | +1.9 | +4.1 | +4.4 | +8.4 | +1.8 | — | +2.9 |
| 4 weeks, ΔV | +1.9 | +4.8 | +4.4 | +8.6 | +1.4 | — | +2.0 |

[1]Fire retardant manufactured by Mobil Chemical Co.

TABLE III

| Foam Pours | M 100 g | N 200 g | O 200 g | P 100 g |
|---|---|---|---|---|
| Formulation, pbw | | | | |
| Polyol, Ex. VIIN (OH = 94.6) | 40.9 | — | — | — |
| Polyol, Ex. VIIIN (OH = 171) | — | 28.6 | — | — |
| Polyol, Ex. IXN (OH = 207) | — | — | 25.1 | — |
| Polyol, Ex. XN (OH = 224) | — | — | — | 23.7 |

TABLE III-continued

| Foam Pours | M 100 g | N 200 g | O 200 g | P 100 g |
|---|---|---|---|---|
| Silicone DC-193 | 0.5 | 0.5 | 0.5 | 0.5 |
| FREON ® R-11b | 12.0 | 12.0 | 12.0 | 12.0 |
| DABCO ® TMR-2 | 0.5 | 0.5 | 0.5 | 0.5 |
| MONDUR ® MR (index = 5.0) | 46.1 | 58.4 | 61.9 | 63.3 |
| Details of Preparation Times, seconds | | | | |
| Mixing | 3 | 5 | 8 | 10 |
| Cream | 18 | 34 | 22 | 32 |
| Gel | 47 | 120 | 54 | 81 |
| Tack free | 300+ | 300+ | 162 | 177 |
| Rise | 100 | 158 | 116 | 124 |
| Initial Surface Friability | None | Some | Yes | None |
| Foam Appearance | Fair | Good | Good | Good |
| Physical Properties | | | | |
| Density, (lbs/ft$^3$) | 2.53 | — | — | 2.15 |
| Compression strength, psi | | | | |
| with rise | — | — | — | — |
| against rise | — | — | — | — |
| Heat distortion, °C. | — | — | — | — |
| Closed cells, % | — | — | — | — |
| Friability, wt. % loss, 10 minutes | — | — | — | — |

Many modifications may be made in the aromatic polyester polycarbonate polyols of this invention by one skilled in the art without departing from the spirit and scope of the invention which are defined only in the appended claims. For example, the PET residue, alkylene carbonate or alkylene oxide and CO$_2$, the relative proportions thereof, the catalyst, temperature and pressure could be optimized to give a polyol with special characteristics.

We claim:

1. Aromatic polyester polycarbonate polyols prepared by the process comprising
    reacting a residue from the manufacture of polyethylene terephthalate with a carbonating agent selected from the group consisting of alkylene carbonates and the combination of alkylene oxides with carbon dioxide in the presence of a polycarbonate formation catalyst, to produce aromatic polyester polycarbonate polyols.

2. The polyols of claim 1 in which the alkylene carbonates and alkylene oxides have from 2 to 4 carbon atoms.

3. The polyols of claim 1 in which the polycarbonate formation catalyst is selected from the group consisting of sodium stannate, potassium stannate, potassium carbonate, barium oxide, zinc oxide and calcium hydroxide.

4. The polyols of claim 1 in which the resulting polyols have hydroxyl numbers in the range of about 75 to 300.

5. The polyols of claim 1 in which the reaction is conducted at a temperature in the range from about 100° to 200° C. and at a pressure between about 1 and 150 atmospheres.

6. The polyols of claim 1 in which the mole ratio of polyethylene terephthalate residue to carbonating agent ranges from about 1:10 to 1:2.

7. The polyols of claim 1 in which during the reaction, the polycarbonate formation catalyst is present at a level from about 0.2 to 2.0 wt.% basis the total weight of the reactants.

8. Aromatic polyester polycarbonate polyols prepared by the process comprising
    reacting a residue from the manufacture of polyethylene terephthalate with a carbonating agent selected from the group consisting of alkylene carbonates and the combination of alkylene oxides with carbon dioxide, where the alkylene carbonates and alkylene oxides have from 2 to 4 carbon atoms, in the presence of a polycarbonate formation catalyst selected from the group consisting of sodium stannate, potassium stannate, potassium carbonate, barium oxide, zinc oxide and calcium hydroxide at a temperature in the range from about 100° to 200° C., to produce aromatic polyester polycarbonate polyols that have hydroxyl numbers in the range of about 75 to 300.

9. A polyisocyanurate foam obtained by reacting in the presence of a blowing agent and a catalyst of polyisocyanurate formation, an organic polyisocyanate and an aromatic polyester polycarbonate polyol, where the polyol is made by the process comprising
    reacting a residue from the manufacture of polyethylene terephthalate with a carbonating agent selected from the group consisting of alkylene carbonates and the combination of alkylene oxides with carbon dioxide in the presence of a polycarbonate formation catalyst.

10. The foam of claim 9 in which the aromatic polyester polycarbonate polyol used therein has a hydroxyl number in the range of about 75 to 300.

11. The foam of claim 9 in which the aromatic polyester polycarbonate polyol used therein is made from alkylene carbonates and alkylene oxides having 2 to 4 carbon atoms, using a polycarbonate formation catalyst selected from the group consisting of sodium stannate, potassium stannate, potassium carbonate, barium oxide, zinc oxide and calcium hydroxide, at a temperature in the range from about 100° to 200° C.

* * * * *